United States Patent [19]
Piacente et al.

[11] Patent Number: 6,119,514
[45] Date of Patent: Sep. 19, 2000

[54] METHOD AND UNIT FOR DETECTING DEFECTS IN THE TREAD BELT OF A TIRE

[75] Inventors: Paolo Piacente, Rome; Massimo Pisciottani, Aprilia, both of Italy

[73] Assignee: Bridgestone Corporation, Tokyo, Japan

[21] Appl. No.: 09/098,083

[22] Filed: Jun. 16, 1998

[30] Foreign Application Priority Data

Jun. 17, 1997 [IT] Italy .......................... T097 A 000521

[51] Int. Cl.[7] ................................................. G01M 17/02
[52] U.S. Cl. ............................................................ 73/146
[58] Field of Search ............................... 73/146; 33/203, 33/203.11, 203.12, 203.13

[56] References Cited

U.S. PATENT DOCUMENTS

| | | | |
|---|---|---|---|
| 3,633,279 | 1/1972 | Frazier et al. .......................... 33/174 R |
| 3,895,518 | 7/1975 | Leblond ...................................... 73/146 |
| 3,941,178 | 3/1976 | Simpson et al. .......................... 33/773 |
| 4,155,170 | 5/1979 | Detwiler ............................... 33/203.16 |
| 5,694,697 | 12/1997 | Curtis ........................................ 33/203 |

*Primary Examiner*—William Oen
*Attorney, Agent, or Firm*—John H. Hornickel; Fred H. Zollinger, III; Mike Sand

[57] ABSTRACT

A method and unit for detecting defects in the tread belt of a tire (2), whereby a circumferential dimension of a tire (2) inflated to a given pressure is measured by means of a detecting device (4) with a roller (40), and the measured dimension is compared by a central control unit (47) with a reference value emitted by an emitter (50), to emit an alarm signal (51) in the event the measured dimension exceeds the reference value by a quantity greater than a predetermined value.

13 Claims, 2 Drawing Sheets

METHOD AND UNIT FOR DETECTING DEFECTS IN THE TREAD BELT OF A TIRE

BACKGROUND OF THE INVENTION

1. Technical Field

The present invention relates to a method of detecting defects in the tread belt of a tire.

2. Background Information

When manufacturing tires, a malfunction of the devices supplying the component elements of the tires to an assembly station may result in the production of tires with faulty tread belts, in particular tread belts lacking one or more tread plies, or comprising plies with wrongly oriented reinforcing cords, e.g. belts comprising two plies with cords oriented the same way.

Such tires are totally unusable and must therefore be rejected immediately.

SUMMARY OF THE INVENTION

It is an object of the present invention to provide a safe, reliable method of recognizing tires featuring faulty tread belts.

According to the present invention, there is provided a method of detecting defects in the tread belt of a tire, the method being characterized by comprising the steps of inflating the tire to a given pressure; measuring a circumferential dimension of the inflated tire; comparing the measured dimension with a reference dimension; and emitting an alarm signal in the event the measured dimension differs from the reference dimension by a quantity greater than a predetermined value.

The above method is particularly effective, in that a defect in the tread belt has invariably been found to correspond to a deviation, with respect to a standard measurement, in the circumferential dimensions of the tire when this is inflated to working pressure or to another given, normally higher than working, pressure.

According to a preferred embodiment of the above method, the measurement of said circumferential dimension comprises measuring the length of an outer maximum circumference of the tire.

When compared, for example, with the detection of other circumferential dimensions, such as a radius or diameter, this particular solution provides for the highest possible degree of reliability by enabling the detection of even minimum dimensional deviations.

The present invention also relates to a unit for detecting defects in the tread belt of a tire.

According to the present invention, there is provided a unit for detecting defects in the tread belt of a tire, the unit being characterized by comprising pneumatic means for inflating the tire to a given pressure; measuring means for measuring a circumferential dimension of the inflated tire, preferably the length of an outer maximum circumference of the tire, and for emitting a first signal proportional to said dimension; an emitter for emitting a second reference signal; and comparing means for comparing said first and said second signal, and for emitting an alarm signal in the event the first signal differs from the second by a quantity greater than a predetermined value.

BRIEF DESCRIPTION OF THE DRAWINGS

A nonlimiting embodiment of the present invention will be described by way of example with reference to the accompanying drawings, in which.

DESCRIPTION OF THE PREFERRED EMBODIMENT

Figure 1:
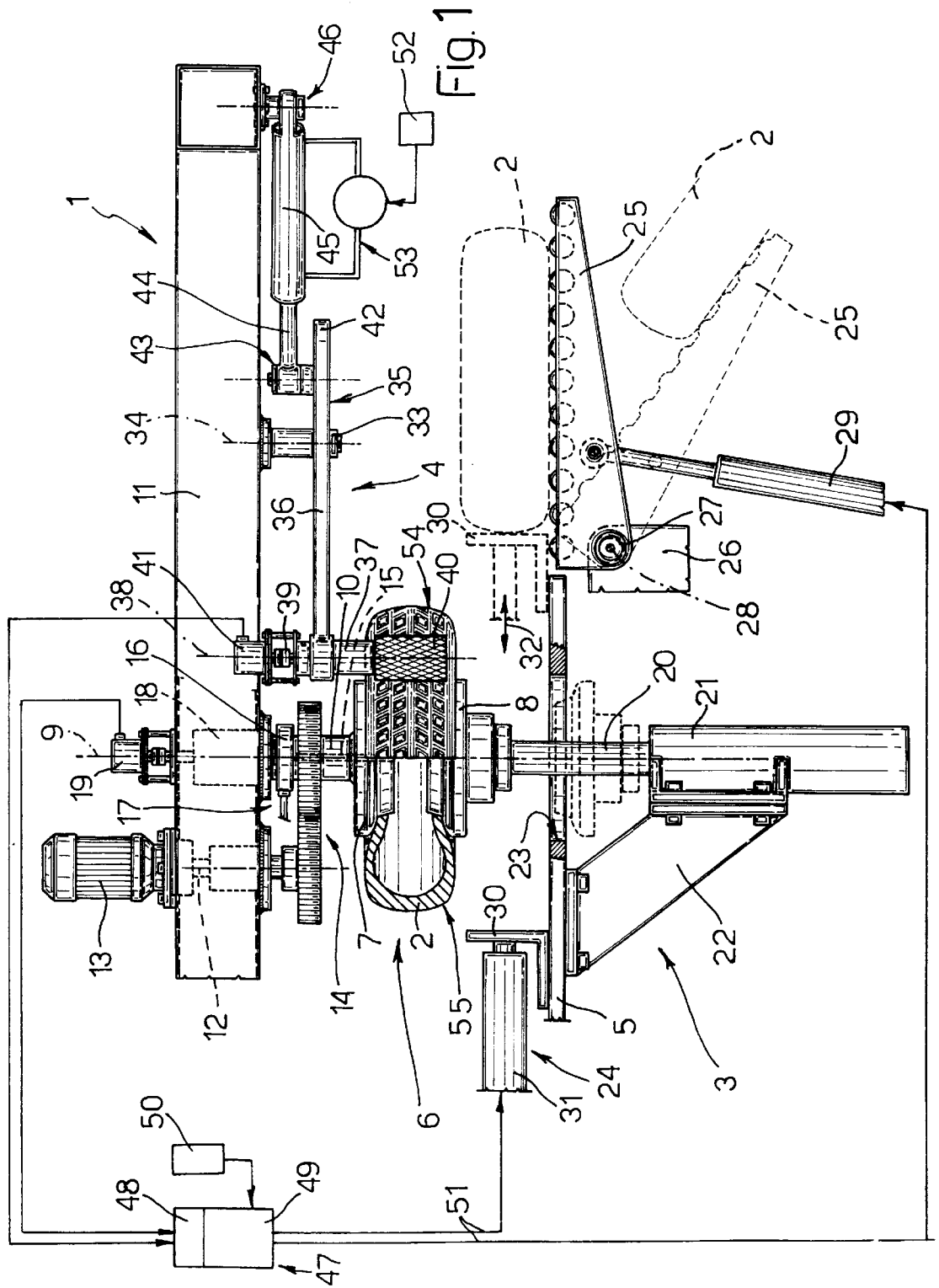
FIG. 1 shows a schematic side view, partly in block form and with parts in section and parts removed for clarity, of a preferred embodiment of the detecting unit according to the present invention.

Number 1 in FIG. 1 indicates as a whole a unit for detecting any defects in the tread belt (not shown) of a tire 2, and comprising a known test machine 3 connected to a detecting device 4.

Machine 3 provides in known manner for performing a series of measurements of tire 2, while detecting device 4 provides, among other things, for measuring the length of a maximum circumference of tire 2 and determining the presence or absence of defects in the tread belt (not shown) of tire 2.

Machine 3 comprises a horizontal roller conveyor (not shown) for successively feeding tires 2 horizontally (i.e. with their axis of rotation positioned vertically), and in a direction perpendicular to the FIG. 1 plane, onto a plate 5 defining a test station 6 where detecting device 4 is located. Machine 3 also comprises two opposite, coaxial spindles 7 and 8 rotating about a vertical axis 9 and located on either side of plate 5. The top spindle 7 is a powered, axially-fixed spindle fitted to a shaft 10 in turn fitted in rotary manner to a fixed frame 11 and connected via a gear transmission 14 to an output shaft 12 of a motor 13 fitted to frame 11. A conduit 15 extends through spindle 7 and shaft 10, and, together with a distributor 16 fitted in known manner to shaft 10, defines the output end of a pneumatic device 17 for supplying compressed air; and shaft 10 is connected via a transmission 18 to the input of an encoder 19 fitted to frame 11.

The bottom spindle 8 is fitted idly to the top end of the output shaft 20 of a linear actuator 21, which is fitted to plate 5 by means of a bracket 22, and moves spindle 8 axially back and forth through an opening 23 in plate 5 to lift a stationary tire 2 in station 6 off plate 5 and into engagement with top spindle 7. When activated, spindle 7 rotates both tire 2 and bottom spindle 8, to enable machine 3 to perform a series of measurements of tire 2.

As shown in FIG. 1, machine 3 comprises a reject device 24 in turn comprising a roller table 25 for receiving a tire 2, and which is hinged to a fixed frame 26 by a hinge 27 with an axis 28 perpendicular to the FIG. 1 plane. Table 25 is activated by an actuator 29 to rotate about axis 28 between a raised rest position (shown by the continuous line), in which table 25 extends laterally with respect to plate 5 and is adjacent to and coplanar with plate 5, and a lowered work position (shown by the dash line), in which table 25 is tilted downwards to unload a tire on it by force of gravity. Reject device 24 also comprises a pusher 30, which is moved by an actuator 31 back and forth over opening 23 and in a direction 32 parallel to plate 5 and to the FIG. 1 plane to transfer a tire 2 from plate 5 to table 25.

Figure 2:
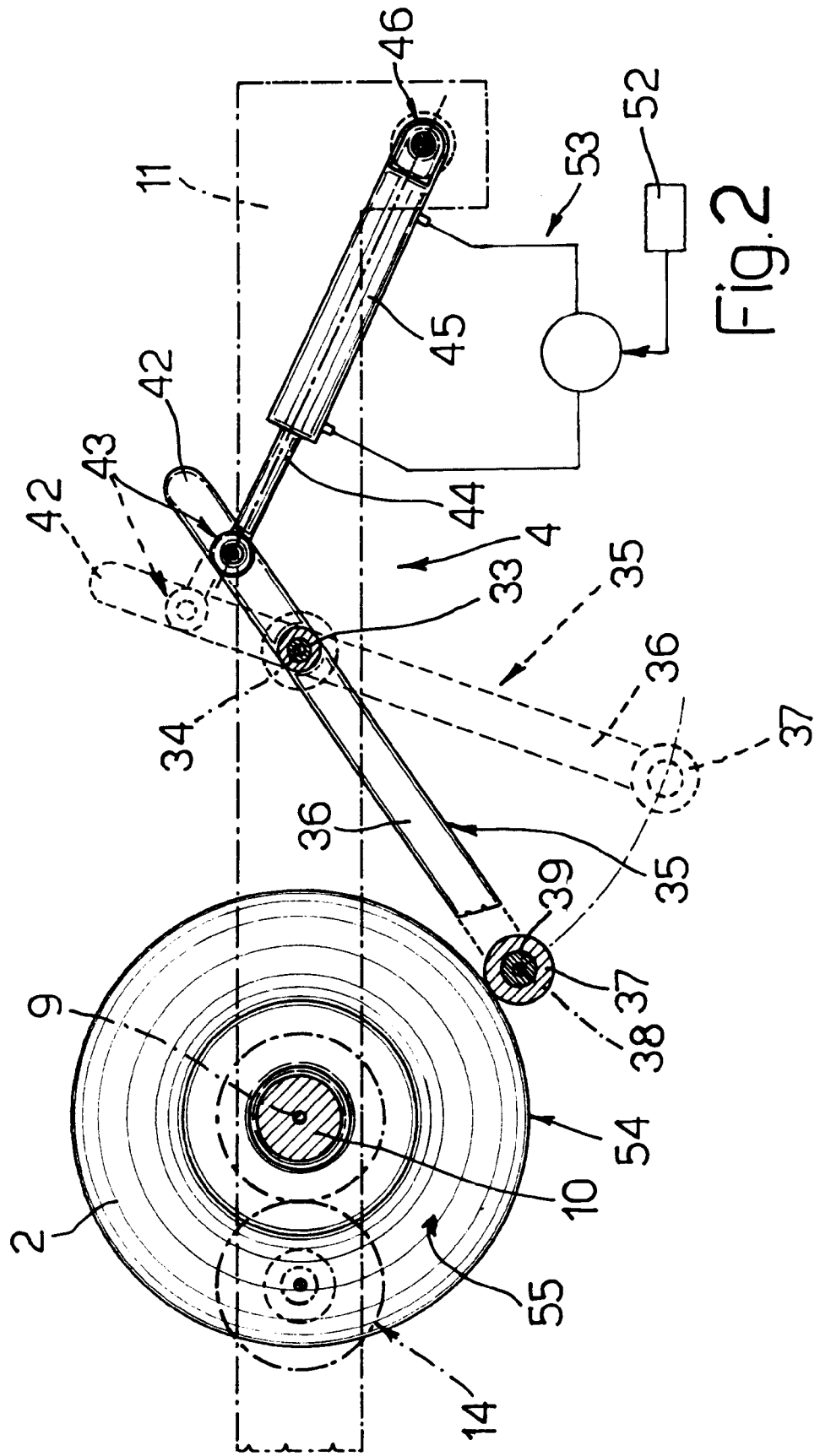
FIG. 2 shows a schematic, larger-scale, top plan view of a detail in FIG. 1.

As shown in FIG. 1 and particularly in FIG. 2, detecting device 4 comprises a pin 33 projecting downwards from frame 11 along an axis 34 parallel to axis 9, and defining the hinge pin of a rocker arm 35, a first arm 36 of which is fitted integrally at the free end with a cylindrical body 37 extending along an axis 38 parallel to axis 9 and housing in rotary manner a shaft 39 connected angularly, in known manner not shown, to the top end of an externally knurled measuring roller 40 coaxial with axis 38. Shaft 39 projects at the top end from body 37, and is connected angularly to the input of an encoder 41 fitted to body 37.

As shown in FIG. 1, measuring roller 40 is located adjacent to spindles 7 and 8, with its top end substantially coplanar with the bottom end of spindle 7, and is of a length greater than half the thickness of the thickest tire fittable to machine 3.

Rocker arm 35 comprises a second arm 42, which is hinged at 43 to the free end of the output rod 44 of a linear actuator 45 hinged at 46 to frame 11.

As shown in FIG. 1, detecting device 4 comprises a central control unit 47, a first section 48 of which receives the outputs of the two encoders 19 and 41, and a second section 49 of which receives a first signal SL processed by section 48, and a second reference signal SR emitted by an emitter 50, compares the two signals, and emits an alarm signal 51 in the event the difference between the signals emitted by section 48 and emitter 50 exceeds a given threshold value.

In the example shown, alarm signal 51 is a reject signal for activating reject device 24.

As shown in FIG. 1, detecting device 4 comprises a known control device 52, which is connected to a hydraulic circuit 53 powering actuator 45, to maintain the contact pressure between measuring roller 40 and a maximum circumference 54 of the outer surface 55 of tire 2.

In actual use, when machine 3 is activated to rotate tire 2 about axis 9, which obviously coincides with the axis of tire 2, circuit 53 is activated to move measuring roller 40 into contact with surface 55 at maximum circumference 54. On contacting surface 55, measuring roller 40 is rotated about its own axis 38 as of a given initial position; and respective encoder 41 supplies central control unit 47 with data, which is evaluated in portion 48 in the light of the data supplied to portion 48 by encoder 19, to determine the angle by which a complete turn of tire 2 about axis 9 has rotated measuring roller 40 from said initial position, and so determine a length L of maximum circumference 54, and to supply portion 49 with signal SL indicating said length L. Signal SL is then compared in portion 49 with the reference signal SR emitted by emitter 50, and, in the event the difference between signals SL and SR exceeds a given threshold value, portion 49 emits signal 51.

In connection with the above, it should be pointed out that controlling the contact pressure between measuring roller 40 and surface 55 of tire 2 prevents any radial deformation of the tire which might affect the measurement of length L. To the same end, the knurled outer surface of measuring roller 40 also provides for absorbing any minor unevenness of surface 55.

A further point to note is that the length of measuring roller 40 is such that detecting device 4 is unaffected by any variation in the size of tires 2 connected to machine 3, and measuring roller 40 is always positioned contacting surface 55 of tire 2 at maximum circumference 54.

We claim:

1. A method of detecting defects in the tread belt of a tire, the method comprising the steps of inflating the tire to a given pressure; measuring a circumferential dimension (L) of the inflated tire; comparing the measured dimension (L) with a reference dimension (L); and emitting an alarm signal in the event the measured dimension (L) differs from the reference dimension by a quantity greater than a predetermined value.

2. A method as claimed in claim 1, characterized in that the measurement of said circumferential dimension (L) comprises measuring the length (L) of an outer maximum circumference of the tire.

3. A method as claimed in claim 2, characterized in that said measurement comprises the substeps of setting a measuring roller, mounted for rotation about a respective axis parallel to an axis of the tire, in a position facing an outer peripheral surface of the tire; bringing the measuring roller into contact with said peripheral surface at a given initial position; rolling the measuring roller along the peripheral surface; measuring an angle by which said measuring roller is rotated about its own axis to return to said initial position; and emitting a signal (SL) as a function of the size of said angle.

4. A method as claimed in claim 3, characterized in that the measuring roller is rolled along the peripheral surface of the tire with a given contact pressure.

5. A method as claimed in claim 3, characterized in that the measuring roller is rolled along the peripheral surface of the tire by maintaining the axis of the measuring roller stationary and rotating the tire about its own axis.

6. A unit for detecting defects in the tread belt of a tire, the unit comprising: a table for receiving a horizontally disposed tire; pneumatic means for inflating the horizontally disposed tire to a given pressure; measuring means for measuring a circumferential dimension (L) of the inflated tire, and for emitting a first signal (SL) proportional to said dimension (L); an emitter for emitting a second reference signal (SR); comparing means for comparing said first and said second signal (SL, SR), and for emitting an alarm signal in the event the first signal (SL) differs from the second signal (SR) by a quantity greater than a predetermined value; and a reject device that removes the horizontally disposed tire from the table when the alarm signal is emitted.

7. A unit as claimed in claim 6, characterized in that said circumferential dimension (L) comprises the length (L) of an outer maximum circumference of the tire.

8. A unit as claimed in claim 7, characterized in that said measuring means comprise a first support for supporting said tire, the first support being arranged in a fixed position and comprising a first axis coincident, in use, with an axis of the tire fitted to the first support; a second support movable to and from the first support in a substantially radial direction with respect to the first axis; a measuring roller fitted to the second support so as to rotate, with respect to the second support, about a second axis parallel to the first axis, and so as to move, in use, with the second support to and from a position tangent to an outer peripheral surface of the tire fitted to the first support; and detecting means for detecting rotation of the measuring roller about the second axis; said detecting means emitting said first signal (SL).

9. A unit as claimed in claim 8, characterized in that said measuring roller is knurled externally.

10. A unit as claimed in claim 8, characterized in that said measuring roller is fitted to said second support in an axially-fixed position, and is of a length, measured along said second axis, greater than half a thickness of the thickest tire fittable to the first support.

11. A unit as claimed in claim 8, characterized by comprising control means for controlling a contact pressure between said measuring roller and said outer peripheral surface of the tire, and for maintaining said pressure within a given limit.

12. A unit as claimed in claim 7, characterized by comprising actuating means connected to said first support to rotate said tire about said first axis.

13. A unit for detecting defects in the tread belt of a tire, the unit comprising:

a table for receiving a horizontally disposed tire;

pneumatic means for inflating the horizontally disposed tire to a given pressure;

measuring means for measuring a circumferential dimension (L) of the inflated tire, and for emitting a first signal (SL) proportional to said dimension (L);

the measuring means including a measuring roller carried at the first end of a rocker arm and a linear actuator connected to the second end of the rocker arm; the rocker arm being moveable by the linear actuator to move the measuring roller into contact with the inflated tire;

an emitter for emitting a second reference signal (SR);

comparing means for comparing said first and said second signal (SL, SR), and for emitting an alarm signal in the event the first signal (SL) differs from the second signal (SR) by a quantity greater than a predetermined value; and a reject device that removes the horizontally disposed tire from the table when the alarm signal is emitted.

* * * * *